United States Patent
Hayashi (10) Patent No.: US 8,406,632 B2
(45) Date of Patent: Mar. 26, 2013

(54) INFRARED COMMUNICATIONS RECEIVER

(75) Inventor: Keiji Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 526 days.

(21) Appl. No.: 12/452,756

(22) PCT Filed: Jun. 4, 2008

(86) PCT No.: PCT/JP2008/060265
§ 371 (c)(1),
(2), (4) Date: Jan. 21, 2010

(87) PCT Pub. No.: WO2009/034753
PCT Pub. Date: Mar. 19, 2009

(65) Prior Publication Data
US 2010/0119233 A1    May 13, 2010

(30) Foreign Application Priority Data

Sep. 10, 2007 (JP) ................................. 2007-234659

(51) Int. Cl.
*H04B 10/00* (2006.01)
(52) U.S. Cl. .......................... 398/106; 398/107; 398/116
(58) Field of Classification Search .......... 398/106–107, 398/115–117, 183–191
See application file for complete search history.

(56) References Cited

U.S. PATENT DOCUMENTS

| 6,528,782 | B1 * | 3/2003 | Zhang et al. | 250/226 |
| 2004/0239923 | A1 * | 12/2004 | Adams et al. | 356/317 |
| 2005/0035728 | A1 * | 2/2005 | Schanberger et al. | 315/291 |
| 2006/0024037 | A1 | 2/2006 | Tsutsumi et al. | |
| 2006/0176917 | A1 * | 8/2006 | Grek et al. | 372/29.02 |
| 2007/0268236 | A1 * | 11/2007 | Morrow | 345/102 |
| 2011/0309754 | A1 * | 12/2011 | Ashdown et al. | 315/151 |

FOREIGN PATENT DOCUMENTS

| JP | 08-149586 | 6/1996 |
| JP | 09-284231 | 10/1997 |
| JP | 2002-238088 | 8/2002 |
| JP | 2006-041657 | 2/2006 |
| JP | 2006-352394 | 12/2006 |

* cited by examiner

Primary Examiner — Dzung Tran
(74) Attorney, Agent, or Firm — Harness, Dickey & Pierce (57) ABSTRACT

An objective of one embodiment of the present invention is to perform infrared communications without error by reducing abrupt noise included in a data signal when a light source of a display device is driven by PWM drive. When a control portion is provided with a drive setting signal for determining whether to drive lamps of a liquid crystal television by pulse width modulation drive or by continuous drive, the control portion sets a threshold in a register for a frequency filter portion based on the provided drive setting signal. Furthermore, upon reception of infrared light from the lamps, the threshold being set is reviewed based on an occurrence frequency for abrupt noise provided by a waveform analysis portion. Thereafter, abrupt noise included in a data signal transmitted from a cell phone is reduced by the frequency filter portion, and then the data signal is transmitted to the liquid crystal television.

3 Claims, 11 Drawing Sheets

| LAMP DRIVE | THRESHOLD FOR FREQUENCY FILTER PORTION | | GAIN FOR AMPLIFICATION PORTION | |
|---|---|---|---|---|
| CONTINUOUS DRIVE | LOW | $\alpha 0$ | LOW | $\alpha 0$ |
| PWM DRIVE | MED ↓ HIGH | $\alpha 1$ $\alpha 2$ $\alpha 3$ • • • $\alpha n$ | MED ↓ HIGH | $\beta 1$ $\beta 2$ $\beta 3$ • • • $\beta 4$ |

| LAMP DRIVE | THRESHOLD FOR FREQUENCY FILTER PORTION | | GAIN FOR AMPLIFICATION PORTION | |
|---|---|---|---|---|
| CONTINUOUS DRIVE | LOW | $\alpha 0$ | LOW | $\alpha 0$ |
| PWM DRIVE | MED / LARGE | $\alpha k$ | MED / HIGH | $\beta k$ |

FIG. 11

INFRARED COMMUNICATIONS RECEIVER

TECHNICAL FIELD

The present invention relates to infrared communications receivers, and particularly to an infrared communications receiver for use with a display device.

BACKGROUND ART

In recent years, high-speed infrared communications, such as IrSS (one-way communications function (Home Appliance Profile) that conforms with IrSimple 1.0 standards), have come into use for transmitting image data for pictures taken by cell phones, digital cameras, etc., to display devices, such as liquid crystal televisions, thereby displaying the pictures, or transmitting and storing such image data to, for example, hard disk recorders. Infrared output power utilized in such infrared communications is lower than that from remote controls for controlling electronic equipment.

On the other hand, emission-line peaks for argon (Ar) and mercury (Hg) gases enclosed in cold cathode fluorescent lamps (CCFLs) (hereinafter, referred to as "lamps") for use as backlights in liquid crystal televisions correspond to rays of near-infrared light having a wavelength of 900 nm to 950 nm. In some cases, such near-infrared light leaks outside the liquid crystal television, and enters a light-receiving portion of an infrared communications receiver included in the liquid crystal television after being reflected by a viewer or a peripheral object.

In the case where a plurality of lamps are driven by continuous drive, the lighting frequency of the lamps is 1 MHz, and therefore the frequency of near-infrared light emitted by the lamps is also approximately 1 MHz. However, rays of near-infrared light emitted by the lamps differ in phase, and therefore overlap with one another so that their optical strengths do not change substantially. When the near-infrared light with a substantially unchanging optical strength enters the light-receiving portion of the receiver simultaneously with infrared light for use in infrared communications, the near-infrared light turns into continuing noise with a substantially unchanging strength (hereinafter, referred to as "continuous noise"). However, when processing a data signal containing continuous noise, a frequency filter portion in the receiver can reduce the continuous noise to a sufficiently low level. Therefore, the continuous noise does not prevent reception of the data signal.

On the other hand, when the lamps are driven by PWM (Pulse Width Modulation) drive, for example, as in the case where backlights are driven by dimming drive, an oscillator for generating a lighting frequency of 1 MHz for the lamps is required to be turned ON/OFF at, for example, 100 kHz. In such a case, a phenomenon is known to occur where not only near-infrared light is generated when the oscillator is turned ON but also near-infrared light with an abruptly changing strength is generated about once every ten times when the oscillator is switchedfromOFFtoON. The near-infrared light with an abruptly changing optical strength has a frequency of about 10 kHz and a pulse width corresponding to a frequency of 1 MHz. When the near-infrared light enters the light-receiving portion of the receiver simultaneously with the infrared light for use in infrared communications, they turn into noise (hereinafter, referred to as "abrupt noise") including pulses with abruptly changing strengths, which prevents reception of the data signal. On the other hand, the near-infrared light that is emitted when the lamps are being driven at 1 MHz turn into noise (hereinafter, referred to as "non-abrupt noise") including no abruptly changing pulses when the near-infrared light enters the light-receiving portion.

Of these noises, the abrupt noise, unlike the non-abrupt noise, is difficult to reduce to a sufficiently low level using the frequency filter portion.

Therefore, conventionally, in order to prevent near-infrared light from lamps that has an abruptly changing optical strength from entering the light-receiving portion of the receiver, optical filters for absorbing near-infrared light are affixed around the lamps.

Also, Patent Document 1 discloses a receiver including a reception status determination portion which, upon reception of a data signal transmitted from a remote control, determines whether the reception of the data signal is good or not, and when the reception is poor, controls a dimmer portion to cancel PWM drive.

Patent Document 2 discloses an optical receiver in which a light-receiving portion provided therein has an optical filter attached thereto such that, when the light-receiving portion receives an infrared signal transmitted from a remote control, near-infrared light emitted by a display device is unlikely to enter the light-receiving portion after being reflected by clothes of a viewer or a peripheral object.

[Patent Document 1] Japanese Laid-Open Patent Publication No. 2006-352394

[Patent Document 2] Japanese Laid-Open Patent Publication No. 2006-41657

DISCLOSURE OF THE INVENTION

Problems to be Solved by the Invention

However, simply affixing the optical filters around the lamps does not reduce any abrupt noise that is generated when the lamps are being driven by PWM drive, and therefore the receiver cannot receive the data signal via infrared communications without error.

Also, as for the receiver disclosed in Patent Document 1, when the reception is determined to be poor, an oscillating portion, which is a noise generation source, is stopped from operating, thereby canceling PWM drive, and therefore the received data signal cannot be outputted to the display device in which the lamps are being driven by PWM drive.

As for the optical receiver disclosed in Patent Document 2, the optical filter is affixed to the light-receiving portion in order to merely make it difficult for infrared light emitted by the display device to enter the light-receiving portion, and therefore, in some cases, the infrared light might enter the light-receiving portion while the lamps are being driven by PWM drive, so that some abrupt noise might occur. As a result, the receiver might not be able to receive the data signal via infrared communications without error.

Therefore, an objective of the present invention is to provide an infrared communications receiver capable of infrared communications without error by minimizing generation of abrupt noise even when a light source of a display device is driven by PWM drive.

Solution to the Problems

A first aspect of the present invention is directed to an infrared communications receiver for use with a display device including a light source, the receiver including:

a light-receiving element for receiving an externally transmitted infrared signal and outputting a data signal;

a frequency filter portion for which a threshold can be set;

a determination portion for receiving a drive control signal including control information for driving the light source, and determining whether or not the light source is being driven by pulse width modulation drive based on the drive control signal; and a control portion for setting the threshold for the frequency filter portion when the light source is determined as being driven by pulse width modulation drive by the determination portion, wherein, when the light source is determined as being driven by pulse width modulation drive by the determination portion, the frequency filter portion reduces an abrupt noise element in the data signal based on the threshold being set, the abrupt noise element being derived from infrared light from the light source.

In a second aspect of the present invention, based on the first aspect of the invention, further included is a detection portion for detecting an occurrence frequency by counting the number of occurrences of the abrupt noise element included in the data signal outputted by the frequency filter portion, and the control portion changes the threshold upon determination that the data signal is unreceivable based on the detected occurrence frequency for the abrupt noise element.

In a third aspect of the present invention, based on the first aspect of the invention, further included is an amplification portion for amplifying the data signal with the abrupt noise element being reduced by the frequency filter portion, the control portion sets a gain corresponding to the threshold for the amplification portion, and the amplification portion amplifies the data signal with the reduced abrupt noise element based on the gain being set.

In a fourth aspect of the present invention, based on the third aspect of the invention, the control portion further contains data for a plurality of preset combinations of the threshold and the gain, and the control portion selects one of the combinations in the data based on the occurrence frequency for the abrupt noise element, and sets the selected threshold for the frequency filter portion and the selected gain for the amplification portion.

Effect of the Invention

According to the first aspect of the invention, the determination portion receives a drive setting signal including control information for driving the light source, and determines whether or not the light source is being driven by pulse width modulation drive based on the received drive information signal. When the determination by the determination portion indicates pulse width modulation drive, the control portion sets a threshold for the frequency filter portion. The frequency filter portion reduces an abrupt noise element, which is derived from infrared light from the light source being driven by pulse width modulation drive, from within a data signal based on the threshold set by the control portion. As a result, an abrupt noise element included in a data signal can be minimized when the light source of the display device is being driven by pulse width modulation drive, and therefore the infrared communications receiver can perform infrared communications without error. Also, when the determination indicates pulse width modulation drive based on the drive setting signal including control information for driving the light source, a threshold for reducing the abrupt noise element is set for the frequency filter portion. As a result, reduction of abrupt noise in the data signal begins when driving of the light source starts.

According to the second aspect of the invention, the threshold being set for the frequency filter portion is changed when the data signal is determined to be unreceivable based on an occurrence frequency detected by counting the number of occurrences of an abrupt noise element that has not been reduced by the frequency filter portion. In this case, the threshold is changed in accordance with the abrupt noise element being generated, and therefore the abrupt noise element can be reduced more reliably.

According to the third aspect of the invention, a gain corresponding to the threshold being set for the frequency filter portion is set for the amplification portion, thereby amplifying a data signal with the abrupt noise element being reduced by the frequency filter portion. As a result, the amplitude of the data signal, which has been reduced at the time of the processing by the frequency filter, can be recovered.

According to the fourth aspect of the invention, the control portion has preset data for a plurality of combinations of threshold for the frequency filter portion and gain for the amplification portion. As a result, it is only necessary to select any one of the combinations in the preset data and set a threshold and a gain included in the selected combination for the frequency filter and the amplification portion, respectively, and therefore the threshold and the gain can be readily set.

DESCRIPTION OF THE REFERENCE CHARACTERS 10 light-receiving element
20 frequency filter portion 30 waveform analysis portion
40 amplification portion
50 control portion
50b register
100, 110 infrared communications receiver
310 PWM control portion
320 lamp
330 light source lighting portion
Jf occurrence frequency

BEST MODE FOR CARRYING OUT THE INVENTION

1. Embodiment

<1.1 Configuration and Operation of the Receiver>

Figure 1:
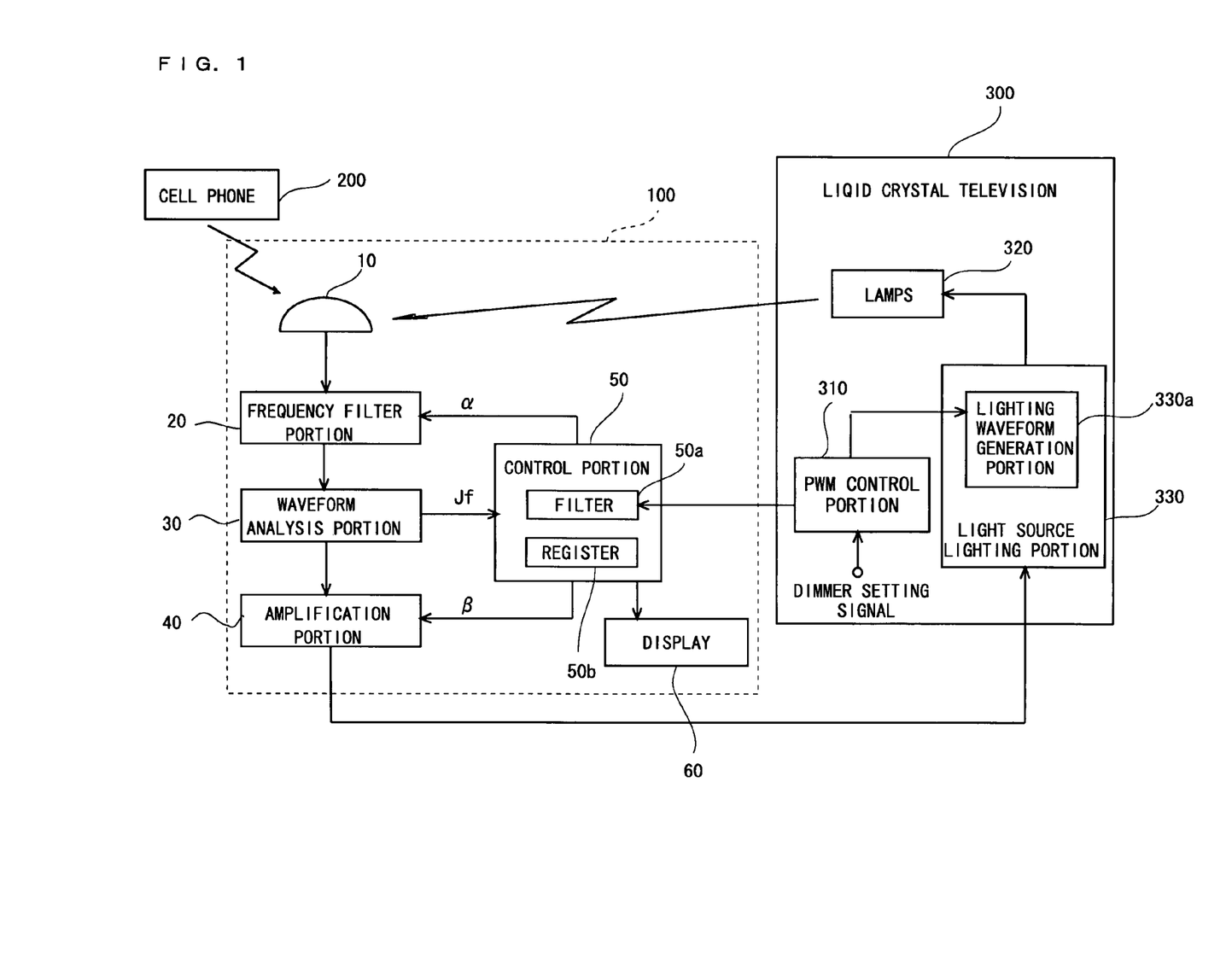
FIG. 1 is a block diagram illustrating the overall configuration of a reception system including an infrared communications receiver according to an embodiment of the present invention.

FIG. 1 is a block diagram illustrating the overall configuration of a reception system including an infrared communications receiver 100 according to an embodiment of the present invention. In the reception system, image data for a picture taken by a cell phone 200 is transmitted to the receiver 100 via IrSS in high-speed infrared communications, and the receiver 100 outputs the received image data to a liquid crystal television 300, thereby displaying the picture taken by the cell phone 200 on the liquid crystal television 300.

Figure 2:
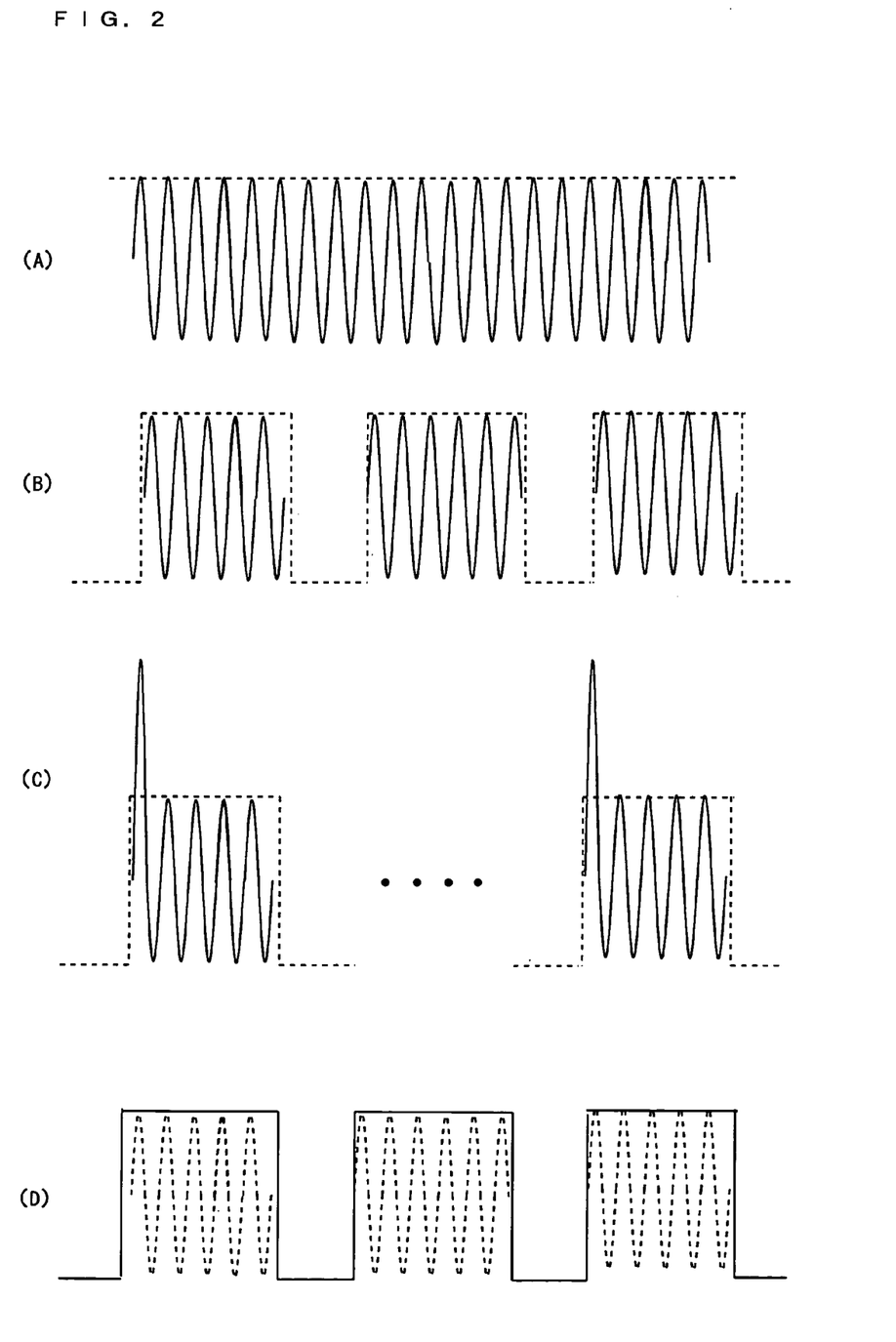
FIG. 2 is a diagram illustrating waveforms of alternating-current voltages for driving lamps included in a liquid crystal television as backlights in the embodiment.

Also, FIG. 2 is a diagram illustrating waveforms of alternating-current voltages for driving lamps 320 included in the liquid crystal television 300 as backlights.

As shown in FIG. 1, the receiver 100 includes a light-receiving element 10, a frequency filter portion 20, a waveform analysis portion 30, an amplification portion 40, a control portion 50, a filter 50a, a register 50b, and a display 60.

The cell phone 200 converts the image data for the taken picture into infrared light modulated at a frequency of 40 kHz (hereinafter, abbreviated as a "40-kHz infrared light"), and transmits the light to the light-receiving element 10 of the receiver 100 via IrSS.

The liquid crystal television 300 includes a PWM control portion 310, a plurality of lamps 320 as backlights, a light source lighting portion 330, and a lighting waveform generation portion 330a. The lamps 320 emit not only rays of white light for irradiating a liquid crystal panel but also rays of near-infrared light having a wavelength of 900 nm to 950 nm, which correspond to emission-line peaks of enclosed argon (Ar) and mercury (Hg) gases.

The lamps 320 are driven either by continuous drive in which 1-MHz frequency alternating-current voltages are applied for lighting up the lamps 320, as shown in FIG. 2(A), or by PWM drive in which the 1-MHz frequency alternating-current voltages are further repeatedly turned ON/OFF at 100 kHz for lighting up the lamps 320, as shown in FIG. 2(B).

First, the case where the lamps 320 are driven by continuous drive will be described. As shown in FIG. 2(A), when a 1-MHz alternating-current voltage is applied to each of the lamps 320 for lighting up, the lamps 320 emit rays of near-infrared light with their optical strengths changing at 1 MHz, which is approximately equal to the lighting frequency. However, the alternating-current voltages for driving the lamps 320 differ in phase, and therefore the rays of near-infrared light emitted by the lamps 320 also differ in phase. Accordingly, the rays of near-infrared light emitted by the lamps 320 overlap with one another, and change little in optical strength. Such light turns into continuous noise after entering the light-receiving element 10.

Next, the case where the lamps 320 are driven by PWM drive will be described. As shown in FIG. 2(B), the lamps 320 are driven by alternating-current voltages generated by further turning the 1-MHz frequency alternating-current oscillator ON/OFF at 100 kHz. The lamps 320 are simultaneously turned ON/OFF. When the 1-MHz frequency alternating-current oscillator is switched from OFF to ON, i.e., when a square wave, which is represented by dotted lines outlining the waveform of the 1-MHz alternating-current voltage as shown in FIG. 2(C), rises. At this time, a pulse of near-infrared light with a width corresponding to a 1-MHz frequency and an abruptly changing strength is generated about once every ten times, i.e., at a 10-kHz pulse recurrence frequency (hereinafter, referred to as a "frequency"). In addition, when the 1-MHz frequency alternating-current voltages are applied to the lamps 320, the lamps 320 also emit near-infrared light with a substantially unchanging strength as in the case where the lamps are driven by continuous drive.

The light-receiving element 10 receives 40-kHz infrared light transmitted from the cell phone 200, and converts the light into a data signal. At this time, near-infrared light with a substantially unchanging optical strength and near-infrared light with an abruptly changing optical strength, which are both emitted by the lamps 320, also leak outside the liquid crystal television 300, so that the near-infrared light is reflected by a peripheral viewer or object and enters the light-receiving element 10. Then, the near-infrared light with a substantially unchanging optical strength and near-infrared light with an abruptly changing optical strength turn into non-abrupt noise and abrupt noise, respectively, which are outputted to the frequency filter portion 20, along with the data signal. Note that in order not to receive visible light, the light-receiving element 10 is provided with an optical filter (not shown) for simply passing infrared light therethrough.

The frequency filter portion 20 is a bandpass filter with its center frequency being set at 40 kHz in order to pass 40-kHz data signals therethrough. The frequency filter portion 20 has a frequency response such that the maximum gain is obtained at the center frequency and signals pass therethrough without lowering their levels. Also, as the frequency increases/decreases from the center frequency, the gain gradually decreases. Therefore, the level of the signals processed by the frequency filter portion 20 also decreases accordingly. Furthermore, as for any frequencies sufficiently higher or lower than the center frequency, the gain is reduced to zero, so that signals are completely cut off.

The frequency response gradually decreases in accordance with a threshold (cutoff frequency) being set for the frequency filter portion 20 such that the frequency response more gradually decreases to zero as the threshold decreases. Therefore, a signal to be processed is not completely cut off and passes through even if the frequency of the signal is significantly higher or lower than the center frequency. Conversely, as the threshold increases, the gain is more sharply reduced to zero, and therefore the signal to be processed is completely cut off even if the frequency of the signal is close to the center frequency. In this manner, the threshold is a variable for simply changing the frequency of signals to be cut off without changing the gain at the center frequency, and as the value increases, signals at frequencies close to the center frequency are more likely to be cut off.

Accordingly, when a data signal including non-abrupt noise and abrupt noise is processed by the frequency filter portion 20, the non-abrupt noise is reduced to a sufficiently low level. However, the abrupt noise passes through the frequency filter portion 20 about once every one thousand to ten thousand times, i.e., 10-kHz frequency abrupt noise passes as abrupt noise of approximately 1 Hz to 10 Hz. In such a case, the data signal, along with the abrupt noise included therein, is outputted to the subsequent waveform analysis portion 30.

The waveform analysis portion 30 counts the number of times the abrupt noise is provided, thereby detecting an occurrence frequency Jf, and provides the detected occurrence frequency Jf to the control portion 50. The control portion 50 compares the provided occurrence frequency Jf for the abrupt noise with a preset upper tolerance, and when the occurrence frequency Jf is higher than the upper tolerance, the threshold for the frequency filter portion 20 is determined to be changed, and the threshold is set again. In this manner, the threshold is repeatedly set until the occurrence frequency Jf for the abrupt noise is lower than the upper tolerance, and when the occurrence frequency Jf is set to be lower than the upper tolerance, the display 60 indicates that infrared communications are available. Note that the upper tolerance is determined considering the relationship with the time required for transferring image data from the cell phone 200 to the receiver 100.

The amplification portion 40 has a preset gain corresponding to the threshold being set for the frequency filter portion 20. Therefore, the amplification portion 40 amplifies the data signal with the reduced non-abrupt and abrupt noises in accordance with the preset gain, so that the amplitude of the data signal, which has been reduced at the time of the processing by the frequency filter portion 20, is increased back to the level before the processing.

Upon notification by the display 60 indicating that infrared communications are available, the viewer operates the cell phone 200 to transmit image data to the receiver 100 via infrared communications.

When the PWM control portion 310 included in the liquid crystal television 300 is provided with a dimmer setting signal, which is an analog alternating-current voltage, a square-wave PWM setting signal is generated by a 1-MHz frequency sinusoidal-wave PWM setting signal (drive setting signal) shown in FIG. 2(A), or a 1-MHz frequency sinusoidal wave shown in FIG. 2(B), being turned ON/OFF at 100 kHz based on the voltage value. Then, the PWM control portion 310 outputs the generated PWM setting signal to the control portion 50 and the lighting waveform generation portion 330a in the light source lighting portion 330 to be described later.

The control portion 50 determines whether the lamps 320 are driven by PWM drive or by continuous drive based on the PWM setting signal provided by the PWM control portion 310. To this end, the control portion 50 converts the sinusoidal wave of the PWM setting signal into a direct-current waveform signal as indicated by the dotted lines in FIG. 2(A), or a square wave signal as indicated by the solid lines in FIG. 2(D), through the filter 50a having a predetermined time constant and provided in the control portion 50, and the control portion 50 samples the resultant signal at predetermined time intervals. As a result, the control portion 50 determines the drive mode to be continuous drive when obtained values are only high-level values, while determining the mode to be PWM drive when obtained values are high- and low-level values.

When the determination indicates continuous drive, the control portion 50 sets low threshold $\alpha 0$ and gain $\beta 0$ for the frequency filter portion 20 and the amplification portion 40, respectively. As a result, the non-abrupt noise with a substantially unchanging strength is reduced by the frequency filter portion 20 to a sufficiently low level.

On the other hand, when the determination indicates PWM drive, the control portion 50 sets threshold $\alpha 1$ ($\alpha 1 > \alpha 0$) and gain $\beta 1$ ($\beta 1 > \beta 0$) for the frequency filter portion 20 and the amplification portion 40, respectively. Unlike continuous drive threshold $\alpha 0$ and gain $\beta 0$, there are a plurality of sets of PWM drive thresholds and gains, the lowest threshold $\alpha 1$ and gain $\beta 1$ are initially set for the frequency filter portion 20 and the amplification portion 40, respectively.

Then, when no infrared light for infrared communications is transmitted from the cell phone 200, the receiver 100 receives near-infrared light emitted by the lamps 320 at the light-receiving element 10, and provides non-abrupt noise and abrupt noise. The waveform analysis portion 30 counts the number of times the abrupt noise is provided, thereby detecting an occurrence frequency Jf, and provides the detected occurrence frequency Jf to the control portion 50.

The control portion 50 determines whether to change the threshold for the frequency filter portion 20 based on the provided occurrence frequency Jf for the abrupt noise, and sets the threshold for the frequency filter portion 20 again when it is determined to be changed. In this manner, the control portion 50 repeatedly sets the threshold until the occurrence frequency Jf for the abrupt noise is lower than the upper tolerance, and when the occurrence frequency Jf is set to be lower than the upper tolerance, the display 60 indicates that infrared communications are available.

Figure 3:
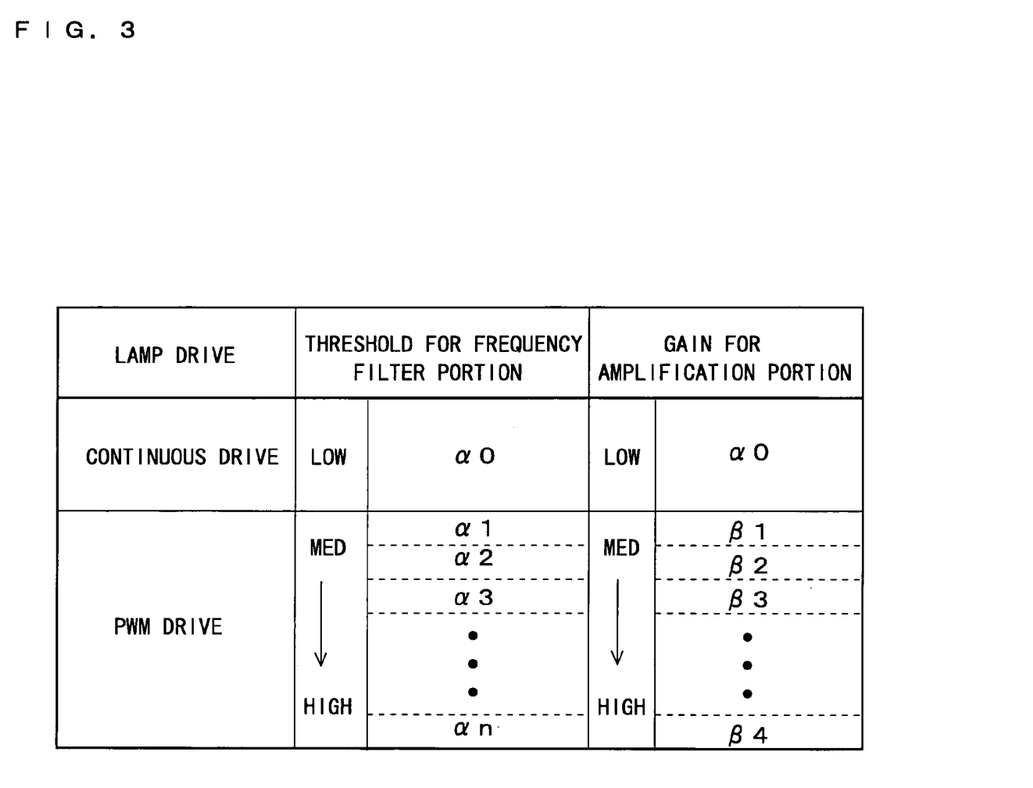
FIG. 3 is a diagram illustrating combinations of threshold for a frequency filter portion and gain for an amplification portion in the embodiment for both cases where the lamps are being driven by continuous drive and where they are being driven by PWM drive.

FIG. 3 is a diagram illustrating combinations of threshold for the frequency filter portion 20 and gain for the amplification portion 40 for both cases where the lamps 320 are being driven by continuous drive and where the lamps 320 are being driven by PWM drive. As shown in FIG. 3, the non-abrupt noise generated during continuous drive is reduced to a sufficiently low level by the frequency filter portion 20 for which low threshold $\alpha 0$ is set. Therefore, a set of low threshold $\alpha 0$ and low gain $\beta 0$ is set in the register 50b of the control portion 50.

Also, in order to reduce the abrupt noise generated during PWM drive, it is necessary to examine the occurrence frequency Jf for the abrupt noise, and change the threshold for the frequency filter portion 20 depending on the occurrence frequency Jf. Accordingly, the register 50b has further stored therein n combinations ($\alpha 1$, $\beta 1$) to ($\alpha n$, $\beta n$) of threshold and gain. The combinations are arranged in order from the lowest threshold $\alpha 1$ to the highest threshold $\alpha n$. Threshold $\alpha 1$ is initially set, and the threshold is sequentially set to be higher as the occurrence frequency Jf for the abrupt noise increases.

By setting a higher threshold for the frequency filter portion 20, noise levels of frequencies close to the center frequency can be reduced, but simultaneously, the amplitude of a data signal to be passed decreases. Therefore, in order to change the amplitude of the data signal back to its initial value after the abrupt noise is reduced, it is necessary to increase the gain for the amplification portion 40 as well in accordance with the threshold.

Accordingly, the thresholds prepared for PWM drive range from about medium to high values, whereas only the low threshold $\alpha 0$ is prepared for continuous drive. Correspondingly, the gains prepared for PWM drive also range from about medium to high values, whereas only the low gain $\beta 0$ is prepared for continuous drive.

<1.2 Operations of the Control Portion>

Figure 4:
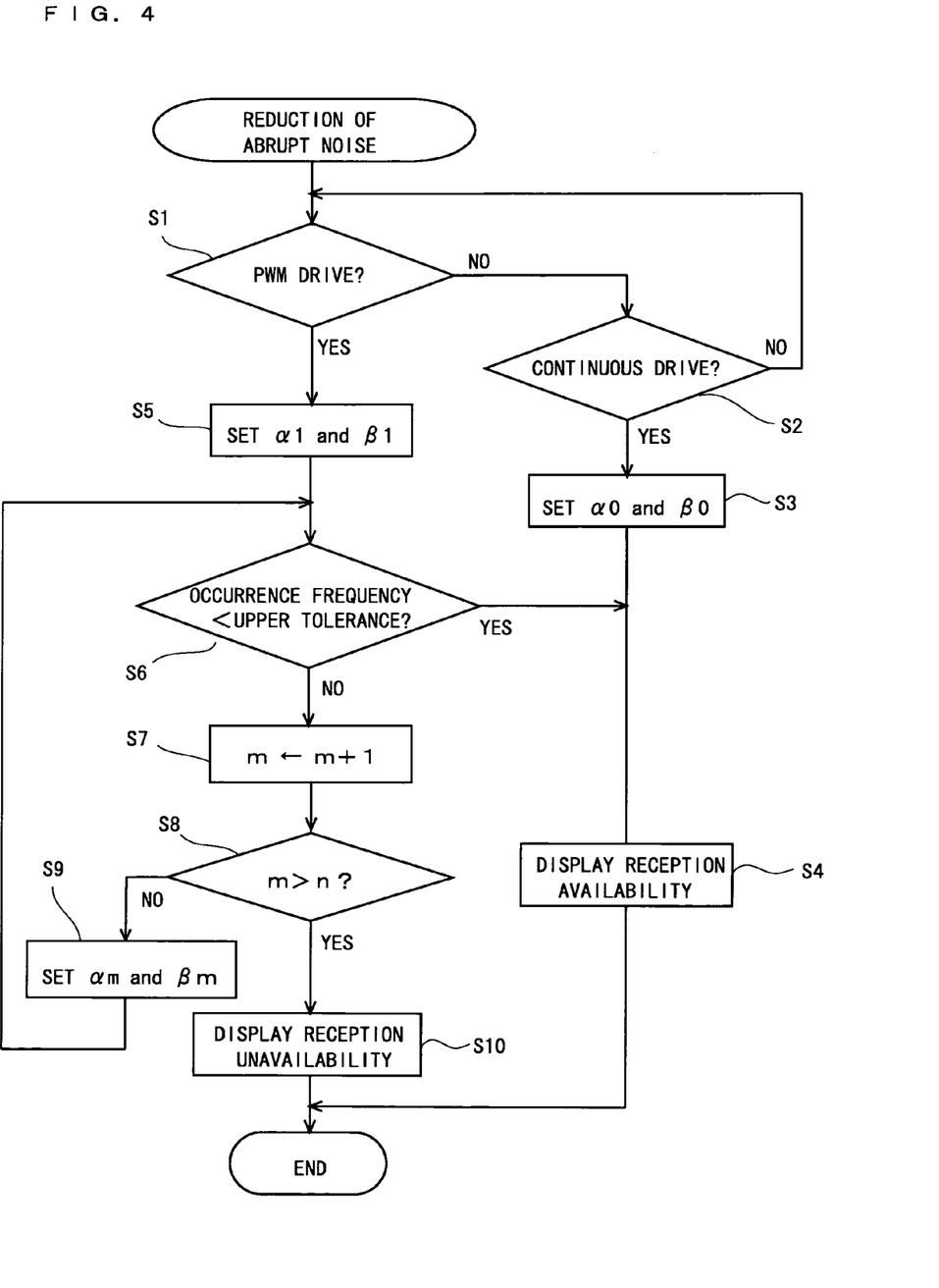
FIG. 4 is a flowchart illustrating the operation of a control portion for sufficiently reducing the abrupt noise level in the receiver according to the embodiment.

FIG. 4 is a flowchart illustrating the operation of the control portion 50 for sufficiently reducing the abrupt noise level in the receiver 100 according to the embodiment. The operation of the control portion 50 to be described with reference to FIG. 4 is to set a threshold and a gain required for sufficiently reducing the abrupt noise level in a data signal including the abrupt noise from the lamps 320.

First, in step S1, whether or not the lamps 320 are being driven by PWM drive is determined based on a PWM setting signal provided by the PWM control portion 310, and when the result is negative, a determination is made in step S2, regarding whether or not the lamps 320 are being driven by continuous drive. When the determination result in step S2 is negative, the lamps 320 are being driven neither by continuous drive nor by PWM drive, and therefore control returns to step S1.

On the other hand, when the determination result in step S2 is affirmative, the lamps 320 are being driven by continuous drive, and therefore included noise is simply non-abrupt. Accordingly, in step S3, continuous drive threshold $\alpha 0$ and gain $\beta 0$ are set for the frequency filter portion 20 and the amplification portion 40. As a result, the continuous noise is reduced to a sufficiently low level by the frequency filter portion 20. Then, control proceeds to step S4, where the message "infrared communications available" is displayed on the display 60, whereby the setting of the threshold and the gain ends.

On the other hand, when the determination is affirmative in step S1, i.e., when the lamps 320 are determined as being driven by PWM drive, the lowest threshold and gain shown in FIG. 3, threshold $\alpha 1$ and gain $\beta 1$, are set in step S5 for the frequency filter portion 20 and the amplification portion 40, respectively.

Next, in step S6, a determination is made regarding whether or not the occurrence frequency Jf for the abrupt noise provided by the waveform analysis portion 30 poses a problem in receiving infrared from the cell phone 200, i.e., whether or not the occurrence frequency is lower than a preset upper tolerance.

When the determination result in step S6 is affirmative, i.e., when the occurrence frequency Jf for the abrupt noise is lower than the upper tolerance, control proceeds to step S4.

On the other hand, when the determination result in step S6 is negative, the occurrence frequency Jf for the abrupt noise is higher than the upper tolerance. Therefore, variable "m" is incremented by 1 in step S7, and a determination is made in step S8, regarding whether or not the incremented variable "m" is higher than "n", which indicates the number of combinations of threshold and gain.

When the determination result in step S8 is negative, the threshold for the frequency filter portion 20 and the gain for the amplification portion 40 are set by selecting a combination corresponding to the variable "m" from among the combinations ($\alpha 1$, $\beta 1$) to ($\alpha n$, $\beta n$) shown in FIG. 3, and control returns to step S6.

On the other hand, when the determination result in step S8 is affirmative, the prepared thresholds do not allow the abrupt noise to be sufficiently reduced, and the message "infrared communications not available" is displayed on the display 60 in step S10, whereby the setting of the threshold and the gain ends.

<1.3 Configuration and Operation of the Light Source Lighting Portion>

Figure 5:
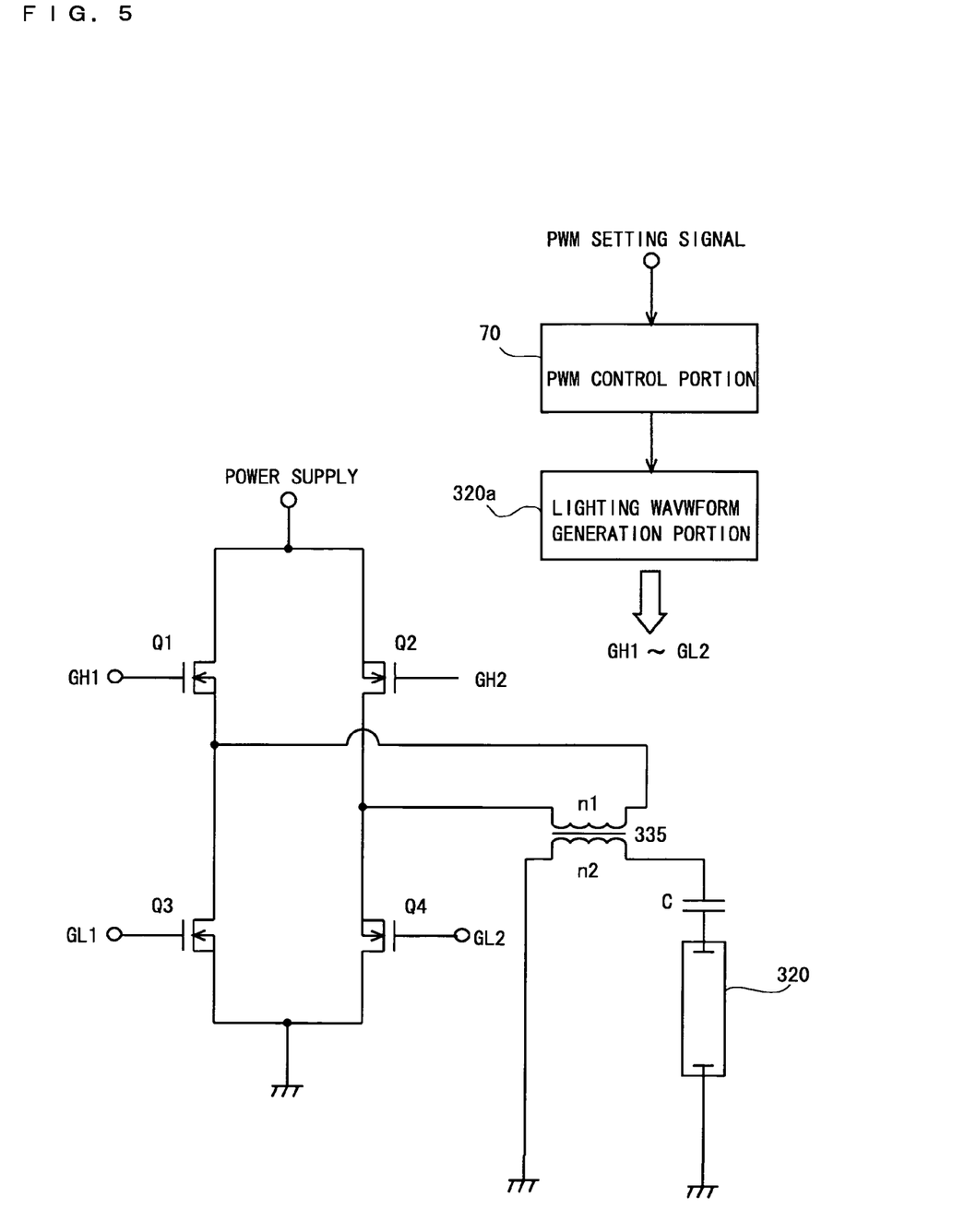
FIG. 5 is a circuit diagram of a light source lighting portion for driving the lamps in the embodiment.
Figure 6:
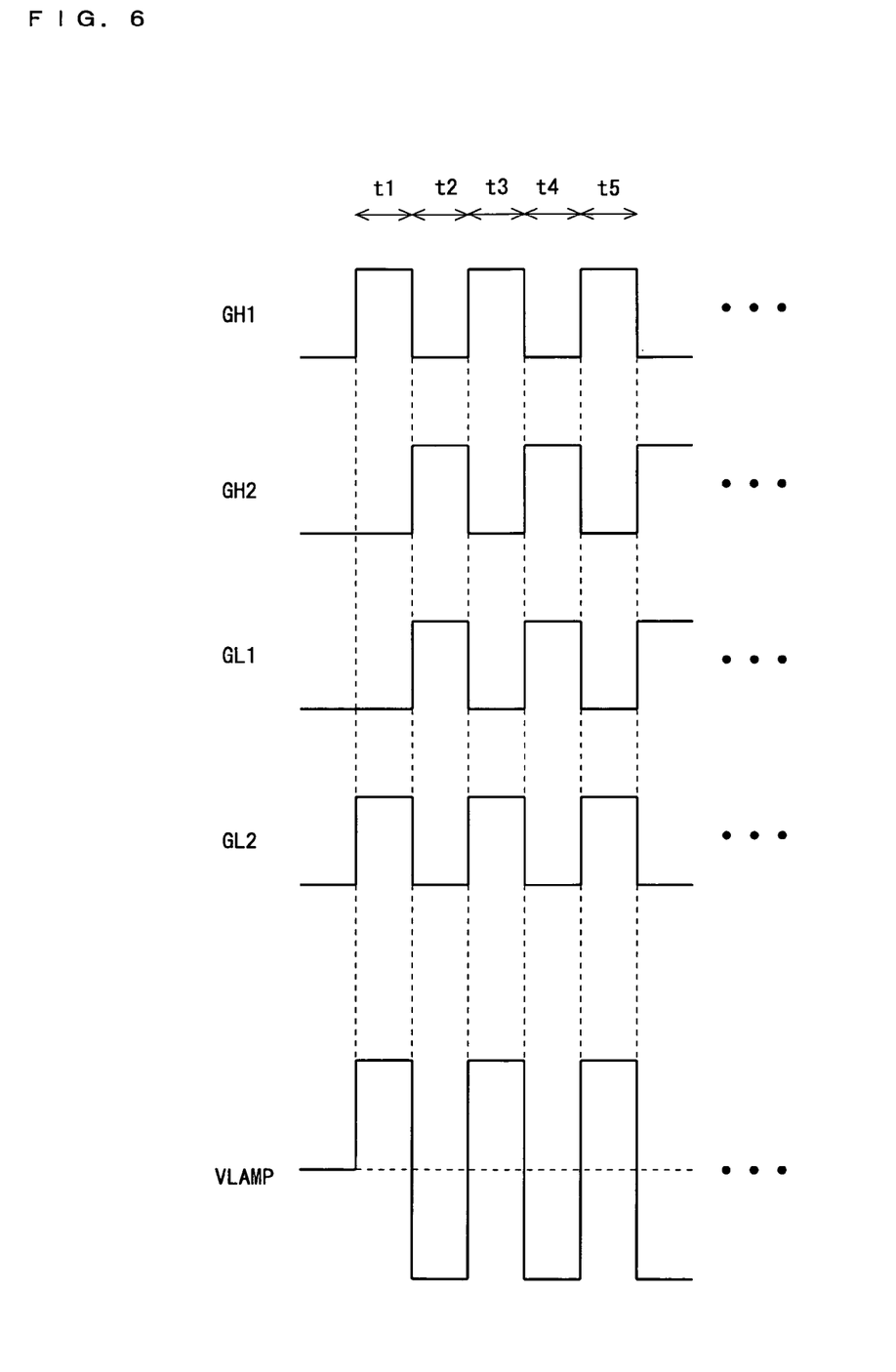
FIG. 6 is a diagram illustrating the timing of gate voltages at MOS transistors included in the light source lighting portion in the embodiment.

FIG. 5 is a circuit diagram of the light source lighting portion 330 for driving the lamps 320, and FIG. 6 is a diagram illustrating the timing of gate voltages GH1 to GL2 at MOS transistors Q1 to Q4 included in the light source lighting portion 330.

In the n-channel MOS transistor (hereinafter, referred to as the "transistor"), the source and the drain are rendered conductive when a high-level voltage is applied to the gate, and they are shut off when a low-level voltage is applied to the gate.

As shown in FIG. 6, during period t1, the gate voltages GH1 and GL2 are at high level, while the gate voltages GL1 and GH2 are at low level. Therefore, the transistors Q1 and Q4 are rendered conductive, and the transistors Q2 and Q3 are shut off. Accordingly, current flows from a power supply and sequentially passes through the transistor Q1, a primary winding n1 of a transformer 335, and the transistor Q4 to a ground terminal. As a result, current also flows through a secondary winding n2 of the transformer 335, so that a drive voltage is applied to the lamp 320 via a capacitor C.

Then, during period t2, the gate voltages GH2 and GL1 are at high level, while the gate voltages GH1 and GL2 are at low level. Therefore, contrary to period t1, the transistors Q2 and Q3 are rendered conductive, and the transistors Q1 and Q4 are shut off. Accordingly, current flows from the power supply to the ground terminal via the transistor Q2, the primary winding n1 of the transformer 335, and the transistor Q3. From this, it can be appreciated that periods t1 and t2 are opposite in terms of the direction of the current flowing through the primary winding n1 of the transformer 335. Thus, current also flows through the secondary winding n2 of the transformer 335 in the direction opposite to the current that flows during period t1, so that a drive voltage opposite in polarity to that during period t1 is applied to the lamp 320 via the capacitor C.

Similarly, the drive voltage to be applied to the lamp 320 during period t3 has the same polarity as that of the drive voltage applied during period t1, the drive voltage to be applied during period t4 has the same polarity as that of the drive voltage applied during period t2, and the drive voltage to be applied during period t5 has the same polarity as that of the drive voltage applied during period t1.

Note that the capacitor C provided at one terminal of the lamp 320 functions as an impedance or resistance for preventing breakage of the lamp 320 due to excess current flowing therethrough.

Figure 7:
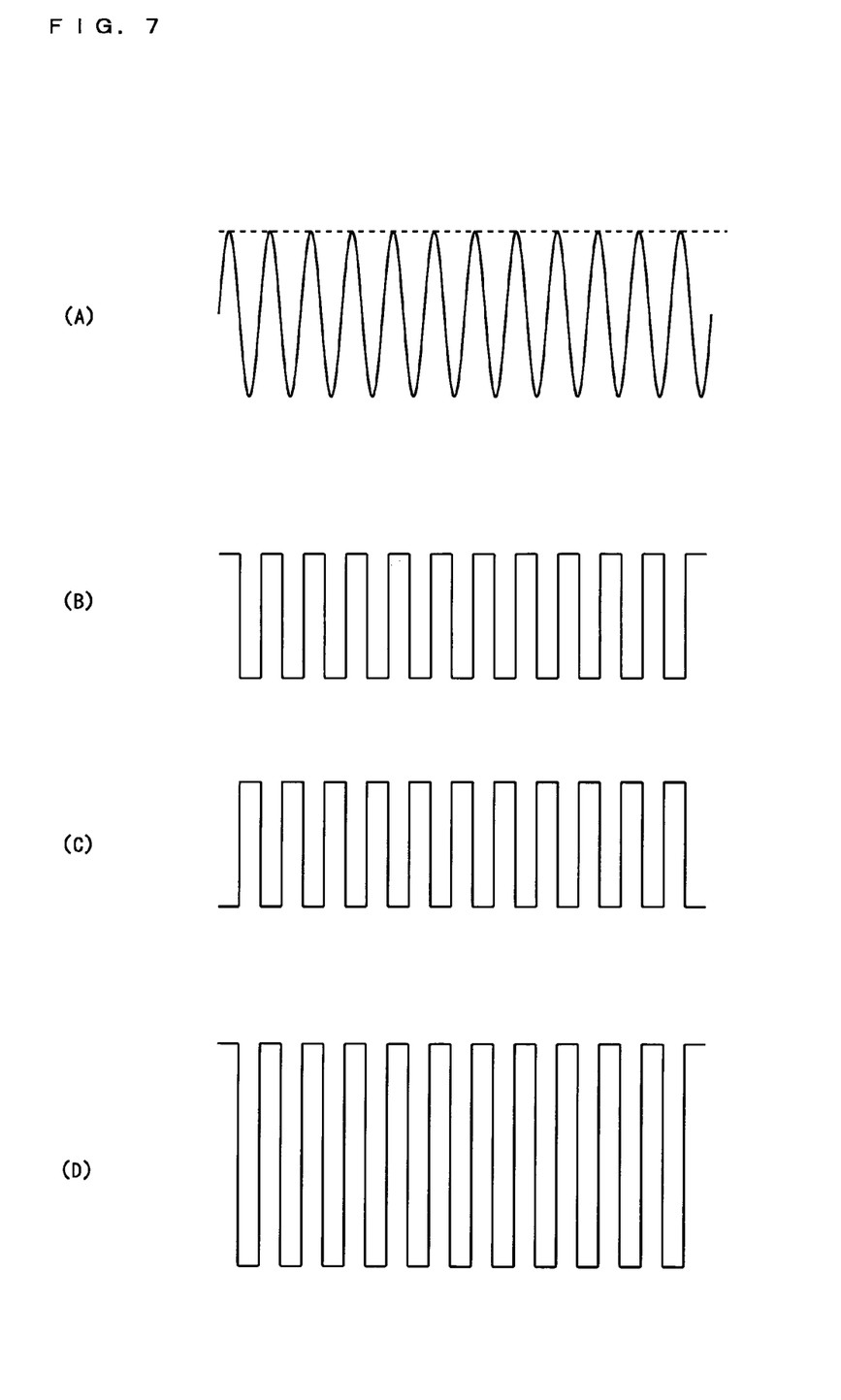
FIG. 7 is a diagram illustrating waveforms of voltages to be applied to the gates of the transistors and the lamps in the embodiment where the lamps are driven by continuous drive.

Next, driving of the lamps 320 will be described. First, the case where the lamps 320 are driven by continuous drive will be described. FIG. 7 is a diagram illustrating waveforms of voltages to be applied to the gates of the transistors Q1 to Q4 and the lamps 320 where the lamps 320 are driven by continuous drive. The PWM control portion 310 provides a sinusoidal-wave PWM setting signal shown in FIG. 7(A) to the lighting waveform generation portion 330a. Based on the provided PWM setting signal, the lighting waveform generation portion 330a generates gate voltages GH1 and GL2 for the transistors Q1 and Q4, which alternate between high and low levels as shown in FIG. 7(B), and gate voltages GH2 and GL1 for the transistors Q2 and Q3, which alternate between high and low levels as shown in FIG. 7(C) in opposite phases to those in FIG. 7(B). The lighting waveform generation portion 330a applies the generated gate voltages GH1 to GL2 to the gates of the transistors Q1 to Q4, thereby driving the transistors Q1 to Q4. As a result, a voltage as shown in FIG. 7(D) is generated for driving the lamps 320 by continuous drive as has already been described. The voltage is applied to the lamps 320, thereby driving the lamps 320 by continuous drive.

Figure 8:
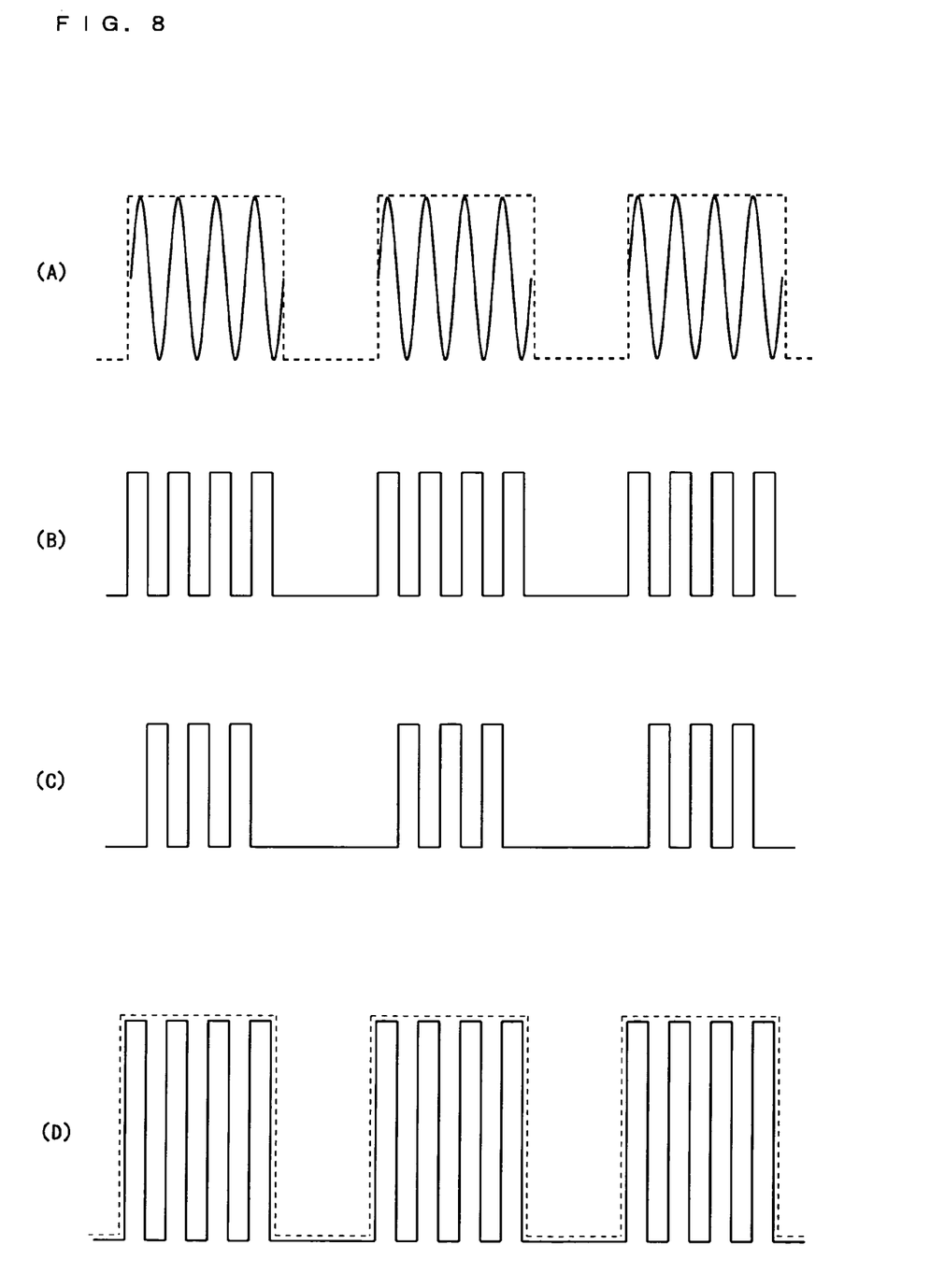
FIG. 8 is a diagram illustrating waveforms of voltages to be applied to the gates of the transistors and the lamps in the embodiment where the lamps are driven by PWM drive.

Next, the case where the lamps 320 are driven by PWM drive will be described. FIG. 8 is a diagram illustrating waveforms of voltages to be applied to the gates of the transistors Q1 to Q4 and the lamps 320 where the lamps 320 are driven by PWM drive. The PWM control portion 310 provides a square-wave PWM setting signal composed of sinusoidal waves shown in FIG. 8(A) to the lighting waveform generation portion 330a. Based on the provided PWM setting signal, the lighting waveform generation portion 330a generates gate voltages GH1 and GL2 for the transistors Q1 and Q4, which repeat periods in which high and low levels alternate and periods in which low level is maintained, in predetermined cycles, as shown in FIG. 8(B). Furthermore, the lighting waveform generation portion 330a also generates gate voltages GH2 and GL1 for the transistors Q2 and Q3, which repeat periods in which high and low levels alternate in opposite phases to those in FIG. 8(B) and periods in which low level is maintained, in predetermined cycles, as shown in FIG. 8(C). The lighting waveform generation portion 330a applies the generated gate voltages GH1 to GL2 to the gates of the transistors Q1 to Q4, thereby driving the transistors Q1 to Q4. As a result, a voltage as shown in FIG. 8(D) is generated for driving the lamps 320 by PWM drive as has already been described. The voltage is applied to the lamps 320, thereby driving the lamps 320 by PWM drive.

<1.4 Effect>

The receiver 100 is capable of infrared communications without error by minimizing generation of abrupt noise even when the lamps 320 of the liquid crystal television 300 are driven by PWM drive. Also, for the frequency filter portion 20, a threshold is set for reducing an abrupt noise element when the lamps 320 are determined as being driven by PWM drive based on a PWM setting signal. As a result, reduction of abrupt noise in a data signal begins when PWM drive of the lamps 320 starts.

Also, based on an occurrence frequency Jf for the abrupt noise provided by the waveform analysis portion 30, the control portion 50 sequentially increases the threshold for the frequency filter portion 20 until reception of the data signal from the cell phone 200 is no longer obstructed. As a result, abrupt noise derived from the lamps 320 of the liquid crystal television 300 can be reduced to a sufficiently low level. At this time, the non-abrupt noise level can also be reduced at the same time.

Furthermore, during PWM drive, the control portion 50 sequentially selects and sets the threshold for the frequency filter portion 20 in order from the lowest threshold $\alpha 1$ among the combinations shown in FIG. 3, and confirms the effect of the threshold upon each setting. As a result, the abrupt noise is reduced using the lowest threshold of the required size, and therefore any adverse influence on the data signal can be minimized. Also, when the threshold is selected, a gain corresponding thereto is simultaneously selected, and therefore the amplitude of the data signal, which has been reduced by the frequency filter portion 20, can be recovered.

<1.5 Variant>

Figure 9:
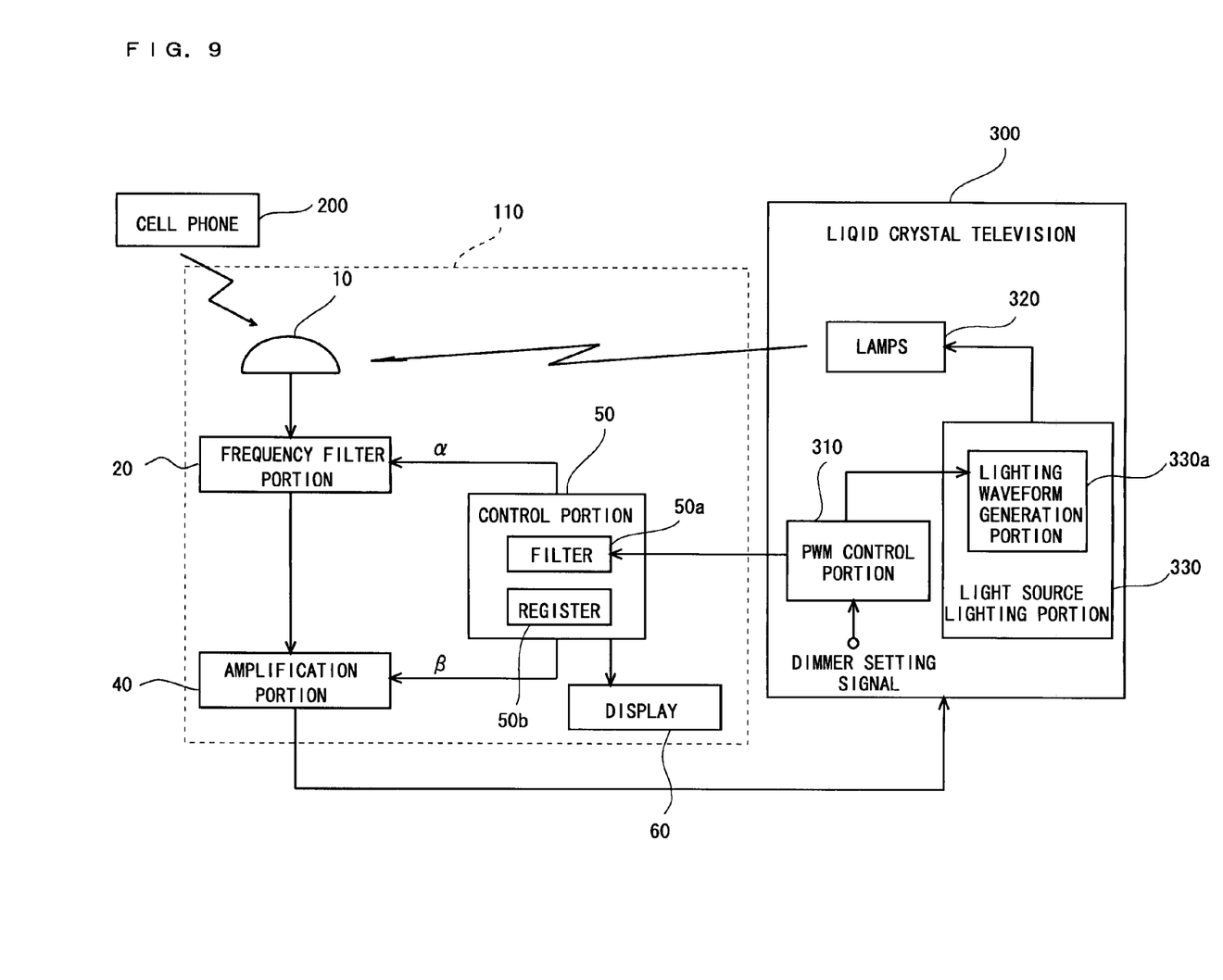
FIG. 9 is a block diagram illustrating the overall configuration of a reception system including an infrared communications receiver according to a variant of the embodiment.

A variant of the embodiment will be described. FIG. 9 is a block diagram illustrating the overall configuration of a reception system including an infrared communications receiver 110 according to the variant. In FIG. 9, elements corresponding to those in FIG. 1 are denoted by the same reference characters, and any descriptions thereof will be omitted.

In this variant, unlike in the embodiment, the waveform analysis portion 30 is not provided, as shown in FIG. 9. Also, FIG. 10 is a diagram illustrating combinations of threshold for the frequency filter portion 20 and gain for the amplification portion 40 in the variant for both cases where the lamps 320 are being driven by continuous drive and where the lamps 320 are being driven by PWM drive, and a combination of threshold and gain is shown for each of the cases of continuous drive and PWM drive.

Figure 10:
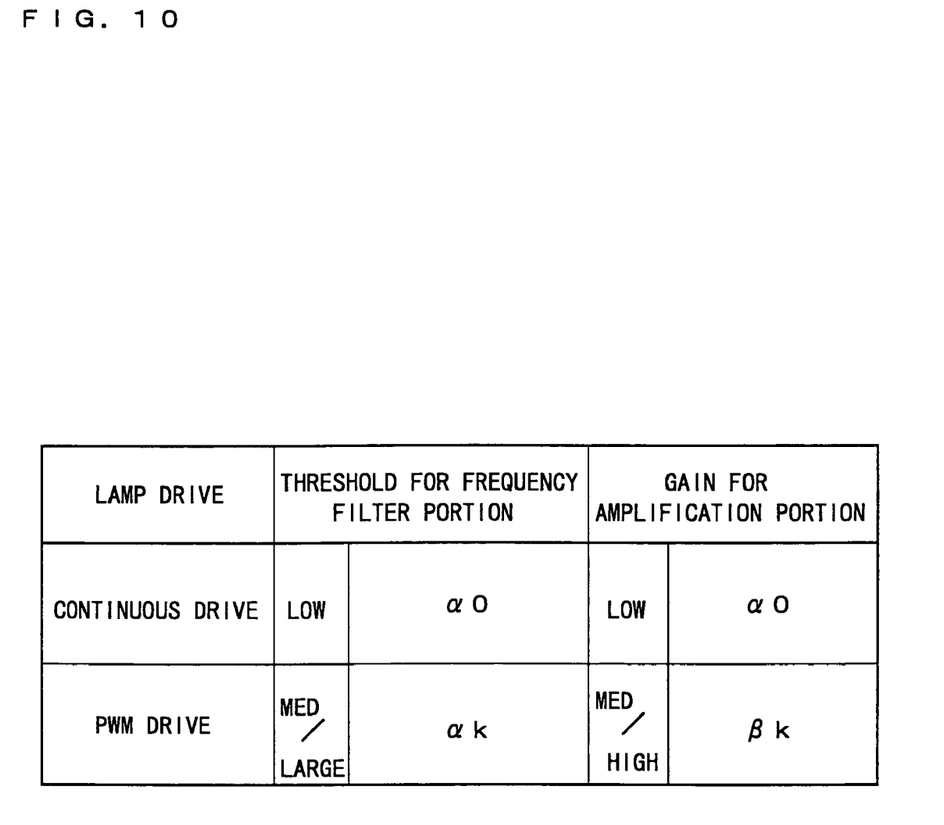
FIG. 10 is a diagram illustrating combinations of threshold for a frequency filter portion and gain for an amplification portion in the variant of the embodiment for both cases where lamps are being driven by continuous drive and where they are being driven by PWM drive.

As described in the embodiment, in the case of continuous drive, the control portion 50 sets continuous drive threshold $\alpha 0$ and gain $\beta 0$ shown in FIG. 10 for the frequency filter portion 20 and the amplification portion 40, respectively, while in the case of PWM drive, PWM drive threshold $\alpha k$ ($\alpha k > \alpha 0$) and gain $\beta k$ ($\beta k > \beta 0$) shown in FIG. 10 are set for the frequency filter portion 20 and the amplification portion 40, respectively.

Note that unlike in the receiver 100 of the embodiment, the waveform analysis portion 30 is not provided, and therefore the control portion 50 cannot determine whether or not threshold $\alpha k$ and gain $\beta k$ set for PWM drive are appropriate, i.e., whether or not the occurrence frequency Jf for the abrupt noise is lower than the upper tolerance. Also, the control portion 50 cannot automatically set any threshold and gain other than threshold $\alpha k$ and gain $\beta k$ regardless of the occurrence frequency Jf for the abrupt noise.

Figure 11:
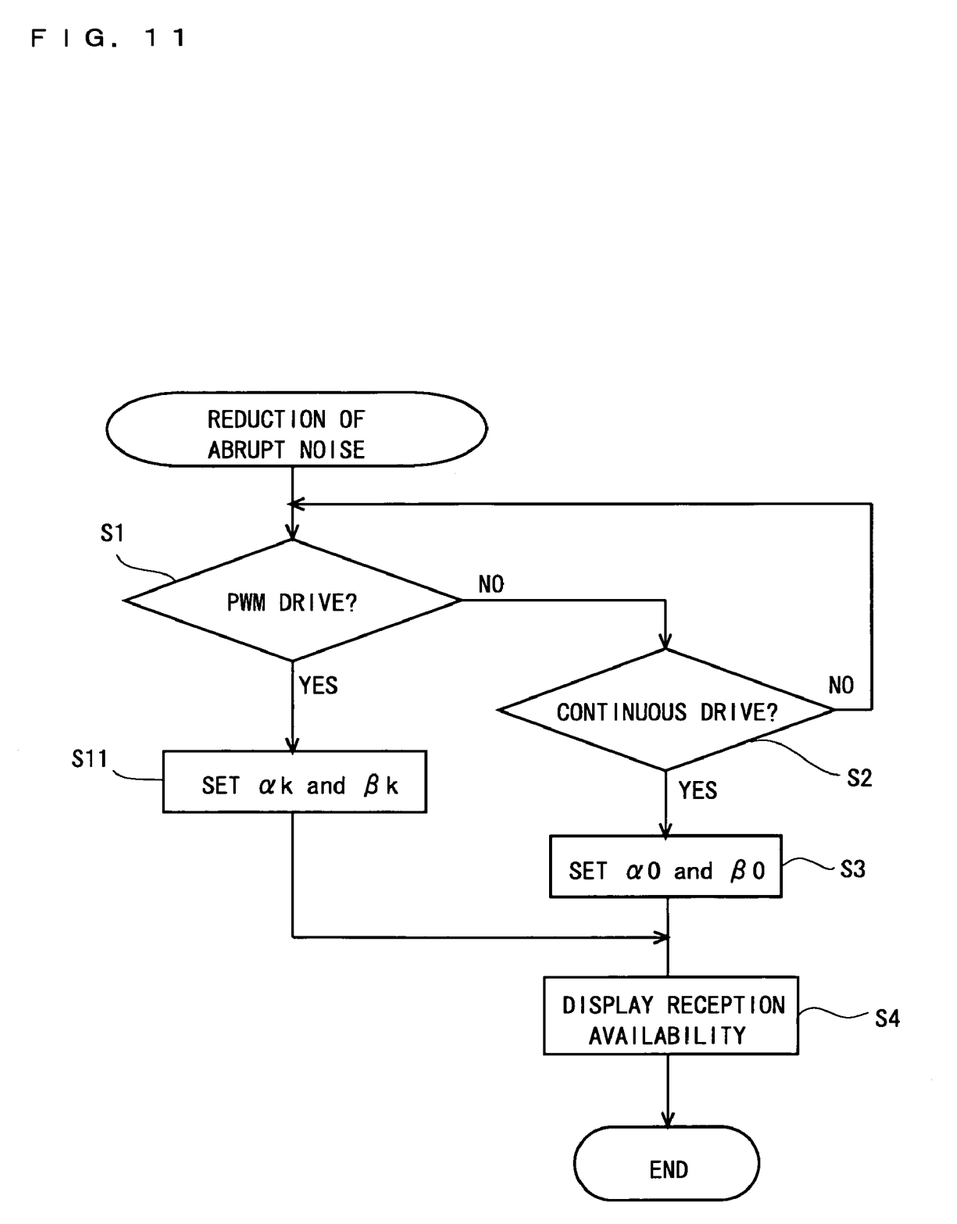
FIG. 11 is a flowchart illustrating the operation of a control portion for reducing the abrupt noise level in the variant of the embodiment.

FIG. 11 is a flowchart illustrating the operation of the control portion 50 for reducing the abrupt noise level. The operation of the control portion 50 to be described with reference to FIG. 11 is to set the threshold and gain required for reducing the abrupt noise level in a data signal including abrupt noise from the lamps 320. Note that the same steps as those shown in FIG. 4 are denoted by the same reference characters.

Initially, in step S1, whether or not the lamps 320 are being driven by PWM drive is determined based on a PWM setting signal from the PWM control portion 310, and when the determination result is negative, a determination is made in step S2, regarding whether the lamps are being driven by continuous drive. When the determination result in step S2 is negative, the lamps 320 are being driven neither by continuous drive nor by PWM drive, and therefore control returns to step S1.

On the other hand, when the determination result in step S2 is affirmative, the lamps 320 are being driven by continuous drive, and therefore noise is simply non-abrupt. Accordingly, in step S3, continuous drive threshold $\alpha 0$ and gain $\beta 0$ shown in FIG. 10 are set for the frequency filter portion 20, and in step S4, the message "infrared communications available" is displayed on the display 60.

On the other hand, when the determination in step S1 is affirmative, i.e., when the lamps 320 are determined as being driven by PWM drive, PWM drive threshold $\alpha k$ and gain $\beta k$ are set in step S11 for the frequency filter portion 20 and the amplification portion 40, respectively. Then, the message "infrared communications available" is displayed on the display 60 in step S4, whereby the setting of the threshold and the gain ends.

Thus, the receiver 110 is capable of infrared communications without error by minimizing generation of abrupt noise even when the lamps 320 of the liquid crystal television 300 are driven by PWM drive. Also, for the frequency filter portion 20, a threshold is set for reducing an abrupt noise element when the lamps 320 are determined as being driven by PWM drive based on a PWM setting signal. As a result, reduction of abrupt noise in a data signal begins when PWM drive of the lamps 320 starts.

Since the waveform analysis portion 30 is not provided in the receiver 110 and the register 50b has stored therein a small number of combinations of threshold and gain, the configuration of the receiver 110 is simpler than the receiver 100 of the embodiment. Thus, the receiver 110 can be produced at low cost.

2. Others

While the receivers 100 and 110 have been described as being included in the liquid crystal television 300 in each of the above embodiments, the receivers 100 and 110 may be located at such a distance as to receive near-infrared noise from the liquid crystal television 300, and are not necessarily included in the liquid crystal television 300. Accordingly, the receivers 100 and 110 may be included in electronic equipment, e.g., a recorder, such as a hard disk recorder, a tuner, or a personal computer, which is located near a television or a data monitor, and may be connected to the liquid crystal television 300 via a cable. In this case, the receivers 100 and 110 receive a PWM setting signal from the liquid crystal television 300, or provide a data signal to the liquid crystal television 300, via the cable.

Also, the liquid crystal television 300 is not restrictive, and a display device may also be used which generates noise at a frequency close to the frequency of a data signal transmitted from the cell phone 200, for example.

Also, while the above embodiment has been described with respect to the case where the receiver is intended for IrSS in unilateral infrared communications, the receiver is not limited to this and may be capable of bi-directional infrared communications.

INDUSTRIAL APPLICABILITY

The present invention is applicable to infrared communications receivers provided in display devices including light sources for displaying data, such as video, on the display devices via infrared communications, and is especially suitable for infrared communications receivers provided in liquid crystal display devices including backlight light sources.

The invention claimed is:

1. An infrared communications receiver for use with a display device including a light source, the receiver comprising:
    a light-receiving element for receiving an externally transmitted infrared signal and outputting a data signal;
    a determination portion for receiving a drive control signal including control information for driving the light source, and determining whether or not the light source is being driven by pulse width modulation drive based on the drive control signal;
    a frequency filter portion for which a threshold can be set, the frequency filter portion reducing an abrupt noise element in the data signal based on the threshold being set, the abrupt noise element being derived from infrared light from the light source, when the light source is determined as being driven by pulse width modulation drive by the determination portion;
    a control portion for setting the threshold for the frequency filter portion when the light source is determined as being driven by pulse width modulation drive by the determination portion; and
    a detection portion for detecting an occurrence frequency by counting the number of occurrences of the abrupt noise element included in the data signal outputted by the frequency filter portion, wherein,
    the control portion changes the threshold upon determination that the data signal is unreceivable based on the detected occurrence frequency for the abrupt noise element.

2. An infrared communications receiver for use with a display device including a light source, the receiver comprising:
    a light-receiving element for receiving an externally transmitted infrared signal and outputting a data signal;
    a determination portion for receiving a drive control signal including control information for driving the light source, and determining whether or not the light source is being driven by pulse width modulation drive based on the drive control signal;
    a frequency filter portion for which a threshold can be set, the frequency filter portion reducing an abrupt noise element in the data signal based on the threshold being set, the abrupt noise element being derived from infrared light from the light source, when the light source is determined as being driven by pulse width modulation drive by the determination portion;
    a control portion for setting the threshold for the frequency filter portion when the light source is determined as being driven by pulse width modulation drive by the determination portion; and
    an amplification portion for amplifying the data signal with the abrupt noise element being reduced by the frequency filter portion, wherein,
    the control portion sets a gain corresponding to the threshold for the amplification portion, and
    the amplification portion amplifies the data signal with the reduced abrupt noise element based on the gain being set.

3. The infrared communications receiver according to claim 2, wherein,
    the control portion further contains data for a plurality of preset combinations of the threshold and the gain, and
    the control portion selects one of the combinations in the data based on the occurrence frequency for the abrupt noise element, and sets the selected threshold for the frequency filter portion and the selected gain for the amplification portion.

* * * * *